UNITED STATES PATENT OFFICE.

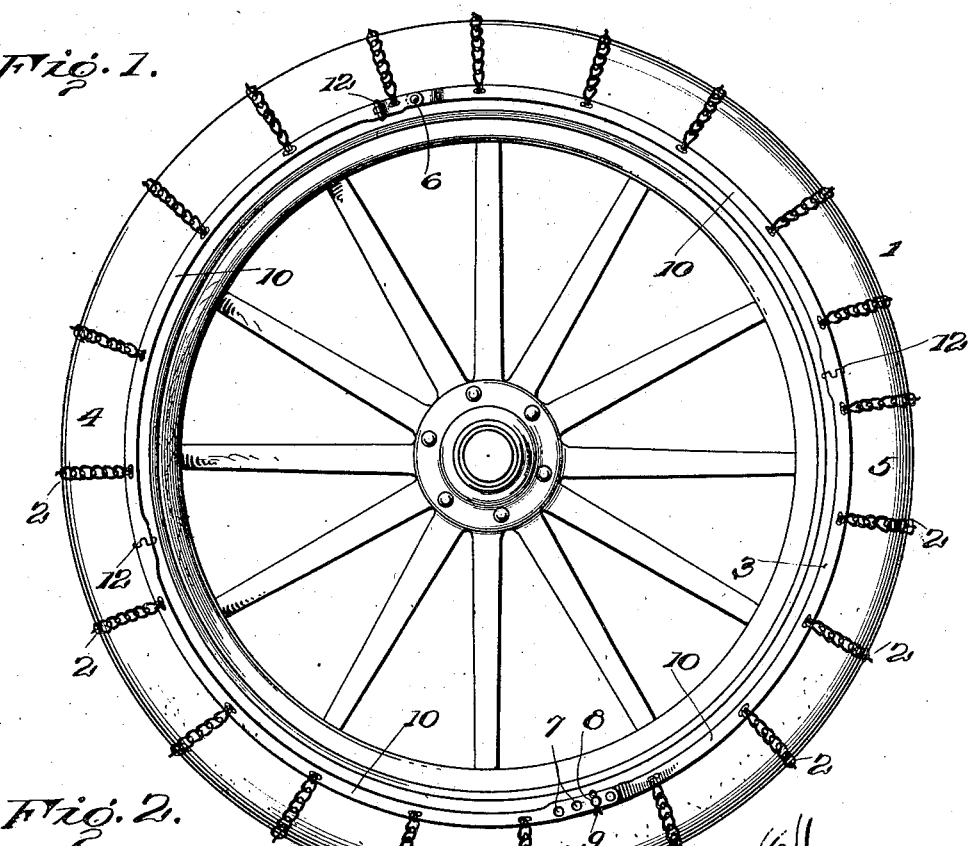
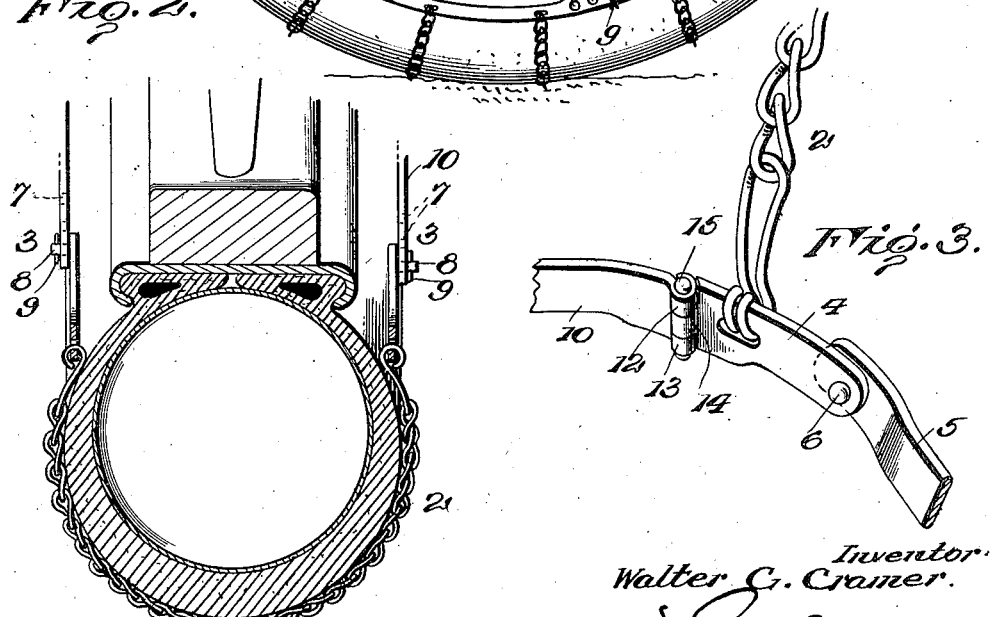
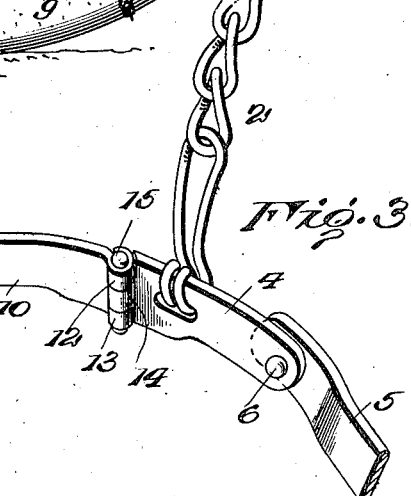

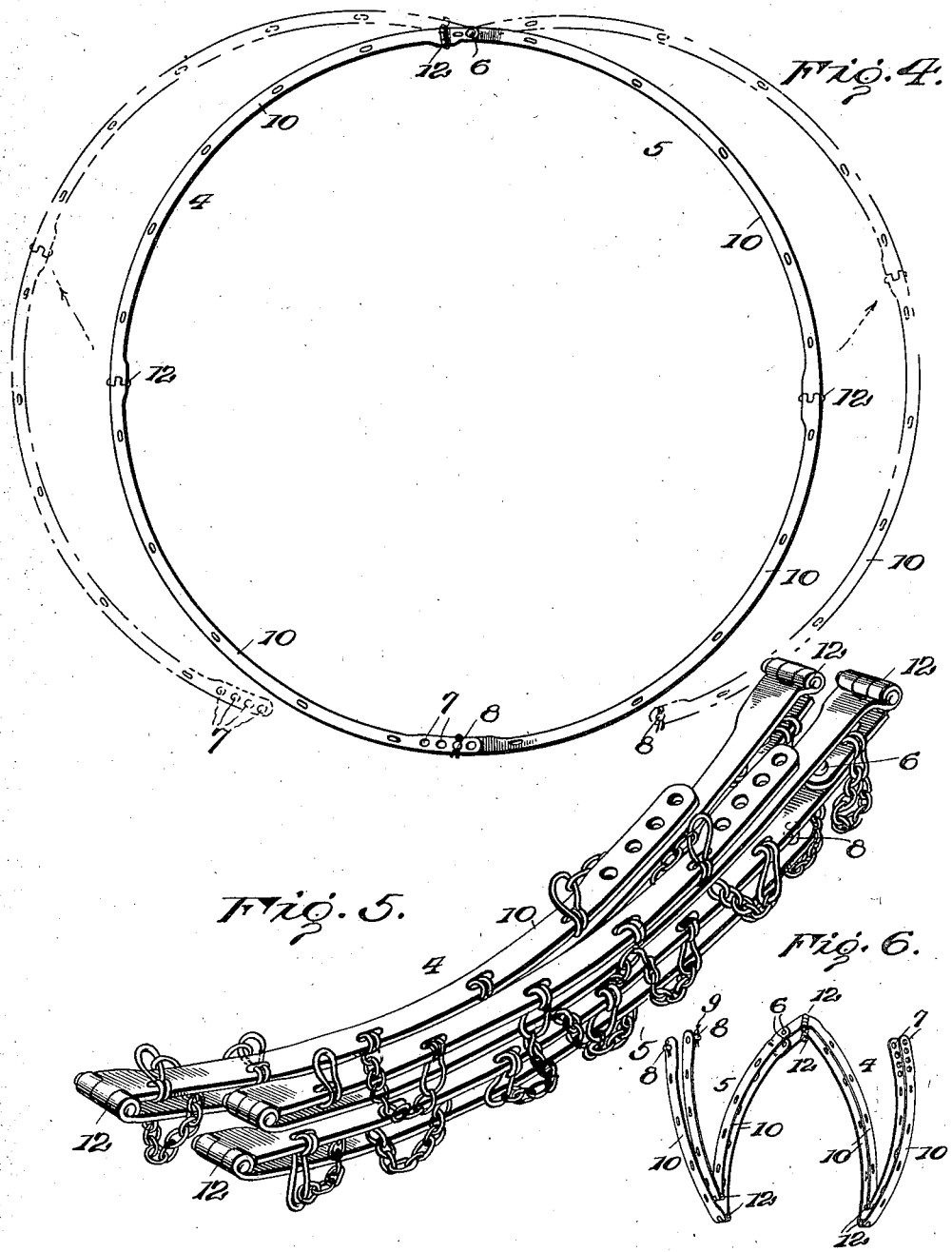

WALTER G. CRAMER, OF CINCINNATI, OHIO.

ANTISKID DEVICE.

1,311,048.    Specification of Letters Patent.    Patented July 22, 1919.

Application filed February 25, 1919. Serial No. 279,035.

*To all whom it may concern:*

Be it known that I, WALTER G. CRAMER, of Cincinnati, in the county of Hamilton and State of Ohio, have invented certain new and useful Improvements in Antiskid Devices; and I do hereby declare the following to be a full, clear, and exact description of the invention, such as will enable others skilled in the art to which it appertains to make and use the same.

The usual type of antiskid devices for automobile wheels is entirely of flexible chain construction. When not in use these chains are carried in bags or loosely thrown into the tool boxes. They frequently become tangled and when it is necessary to apply them it is customary to either jack the machine or lay the chains on the ground and push the machine traction wheels onto them. My object is to provide a device which is incapable of becoming tangled and which may be quickly placed on the wheels without necessitating moving or jacking the vehicle. More especially I provide a device which occupies only a small space when completely folded or collapsed.

In the drawings, Figure 1 is a side elevation of an automobile wheel with the antiskid device attached. Fig. 2 is a cross section through the tire and rim. Fig. 3 is a fragmentary detail. Fig. 4 shows a single ring, the dotted lines indicating the manner in which the ring may be longitudinally opened for attachment to and removal from a wheel. Fig. 5 shows the manner in which the segments are folded to collapse the device and Fig. 6 shows conventionally a stage or position the segments may assume in folding or unfolding. In Figs. 4 and 6 the tread chains are omitted to simplify the illustration.

I have shown an ordinary automobile wheel 1 equipped with a pneumatic tire. The antiskid device includes a number of tread pieces 2 arranged transversely of the tire and preferably consisting of chains. A pair of rings 3 are adapted to support the tread pieces, the rings being disposed on opposite sides of the tire. The tread pieces 2 are secured to these rings. Each ring, when set up, comprises two substantially semi-circular parts or halves 4, 5, which are fulcrumed together as at 6 at a point diametrically opposite the meeting extremities of the parts to permit the parts to be opened or closed longitudinally in attaching and removing the device, as shown in Fig. 4. At their meeting extremities one part of each ring is shown formed with holes 7 adapted to receive studs 8 carried by the extremities of the other part. As a convenient means for locking these extremities I have shown cotter pins 9 passed through the studs.

Each ring, in its entirety, comprises a plurality of segments 10. These are hinged together in such manner that when the device is removed and collapsed the segments are folded upon themselves and in parallelism with each other so that they form a single arc-shaped stack as shown in Fig. 5. To accomplish this purpose I have shown the hinges 12 radially disposed, the extremity of one segment having leaves 13 and the adjacent segment having a lug 14 through which the pintle 15 is passed. As this pintle is disposed substantially radially the segments may fold upon themselves in the manner illustrated, and they are maintained in this compact form because the radial hinges will prevent relative sidewise movements of the folded sections.

The mode of operation is as follows:— To apply the rings the structure as an entirety is opened longitudinally on the fulcrum points 6 so as to separate the parts 4 and 5, as shown by dotted lines, Fig. 4, to permit them being placed over the tire. This may be done while the wheel is resting on the ground and without jacking as the tread pieces 2 are spaced apart sufficiently to allow the extremities to be readily secured together. The structure as thus assembled is strong and durable permitting the desired flexibility and freedom of movement. To remove the device the operation described is reversed. Then the segments 10 of each ring are turned on their hinges 12 to fold upon themselves and form the small arc-shaped stack shown in Fig. 5. A stage or position in this folding action is indicated in the conventional view, Fig. 6.

The folded and collapsed rings may be carried in an appropriate bag or box.

I claim as my invention:

An antiskid device for automobile tires comprising a plurality of tread pieces adapted to be arranged transversely of the tire, a pair of rings adapted to be disposed on opposite sides of the tire and to which said tread pieces are connected, means for securing the free meeting extremities of each ring, each of said rings comprising two substantially semi-circular parts fulcrumed together at a point diametrically opposite the meeting extremities of the ring to permit of lengthwise opening and closing movements and to fold laterally, each of said parts consisting of a plurality of segments connected together by radially disposed hinges and adapted, when the device is removed and collapsed, to fold upon themselves to form a single arc-shaped stack with said segments held against sidewise movement by said radial hinges.

In testimony whereof I have signed this specification.

WALTER G. CRAMER.